May 20, 1924.

J. A. PFEIFFER 1,494,972

PISTON BY-PASS VALVE

Filed Sept. 6, 1919          3 Sheets-Sheet 2

Inventor:
John A. Pfeiffer
by his Attorneys,
Howson & Howson

May 20, 1924.
J. A. PFEIFFER
1,494,972
PISTON BY-PASS VALVE
Filed Sept. 6, 1919
3 Sheets-Sheet 3
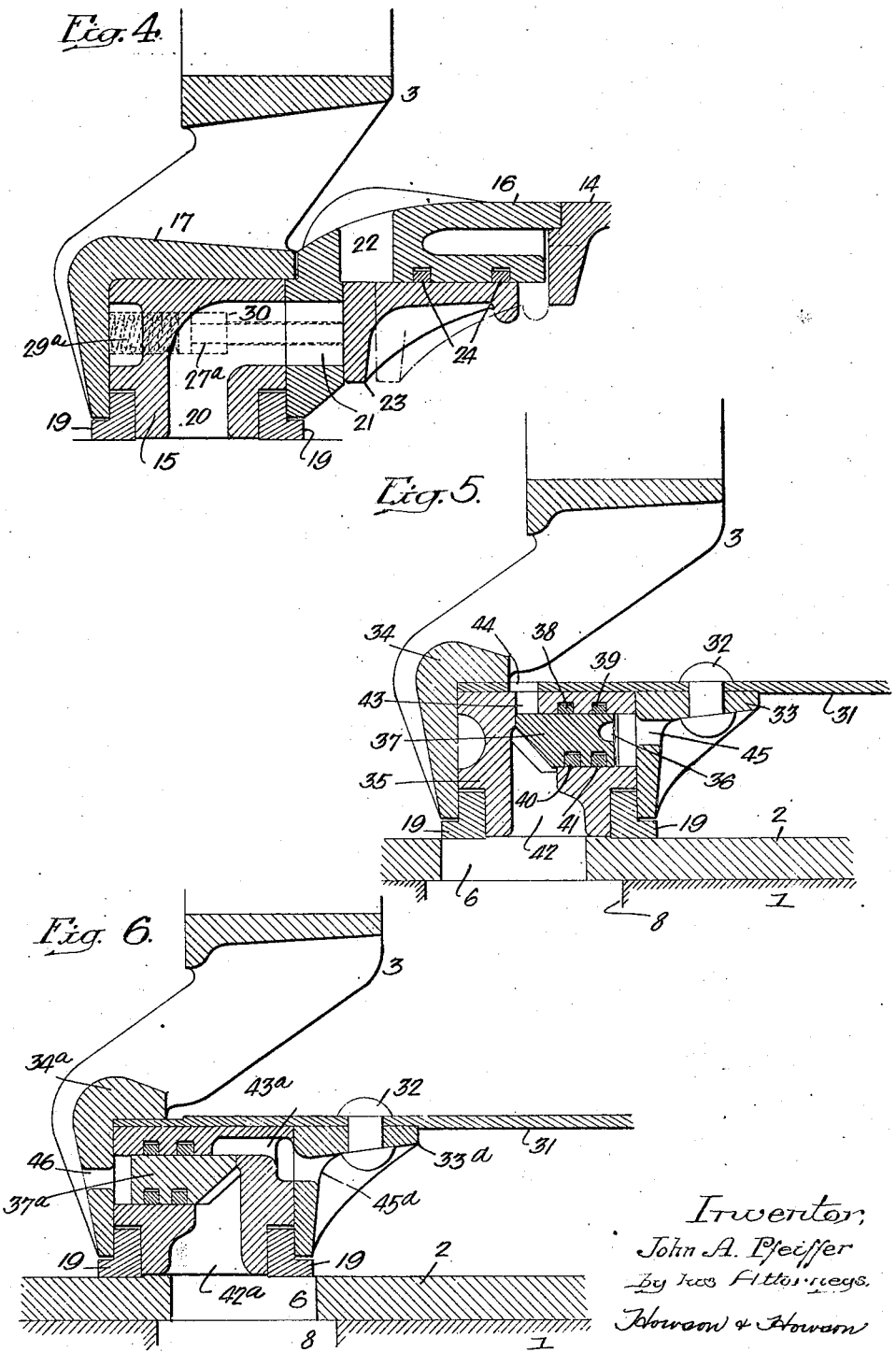

Patented May 20, 1924.

1,494,972

UNITED STATES PATENT OFFICE.

JOHN A. PFEIFFER, OF PHILADELPHIA, PENNSYLVANIA.

PISTON BY-PASS VALVE.

Application filed September 6, 1919. Serial No. 322,104.

*To all whom it may concern:*

Be it known that I, JOHN A. PFEIFFER, a citizen of the United States, residing in Philadelphia, Pennsylvania, have invented a Piston By-Pass Valve, of which the following is a specification.

This invention relates to piston by-pass valves, such as are employed with the piston valves of steam engines for automatically relieving excessive back pressure, resulting from various causes, in the cylinder of said engine. A relief mechanism of this type furnishes the subject matter of my former United States Patent No. 910,851, dated January 26, 1909, and my present invention consists of certain improvements upon this type of relief mechanism and in the addition of certain novel features which will be described hereinafter.

Piston by-pass valves embodying my improvements are illustrated in the attached drawings, in which:

Fig. 4 is a detached view similar to the view of Fig. 3, but illustrating the by-pass valve adapted to use with saturated steam;

Figs. 5 and 6 are detached views similar to views of Figs. 3 and 4, illustrating a modification of the by-pass valve as employed with piston valves having inside and outside admission respectively.

Figure 1:
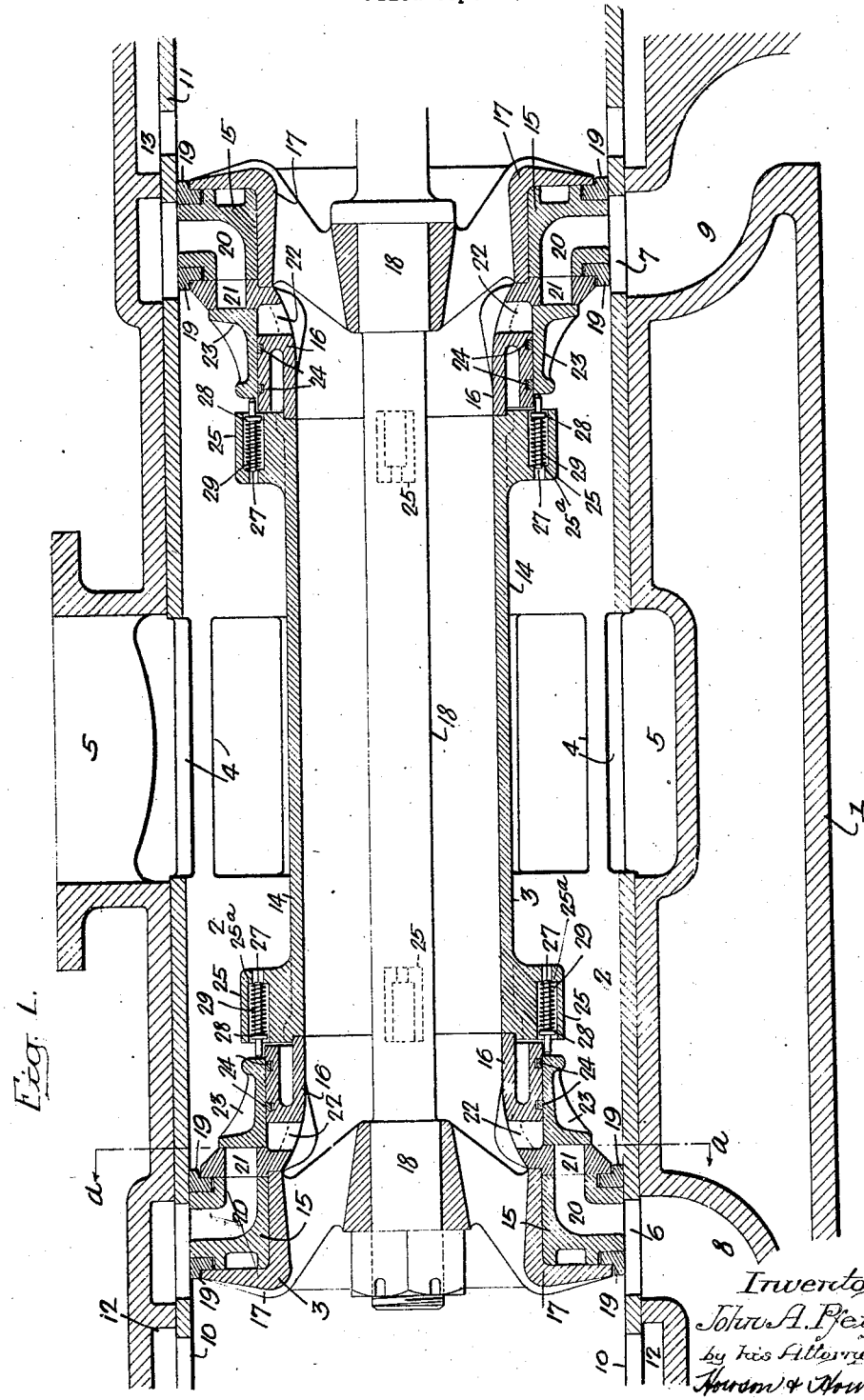
Fig. 1 is a vertical, longitudinal section of a piston valve comprising my by-pass valve, and of a portion of the valve casing in which the said valve operates.
Figure 2:
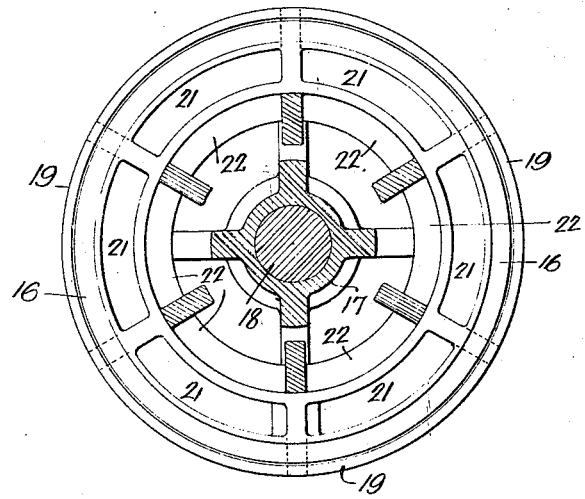
Fig. 2 is a vertical section of the piston valve taken on the line a—a of Fig. 1.

Referring to the drawings, 1 indicates that portion of the cylinder castings of a locomotive forming the valve chamber, 2, in which a piston valve, 3, reciprocates. Inlet ports, 4, are formed in the walls of the valve chamber, 2, through which steam is admitted to said chamber from a steam passage, 5, while ports 6 and 7 open into passages 8 and 9 respectively, leading to opposite ends of the engine cylinder. Exhaust ports, 10 and 11 give access from the interior of the said valve chamber to exhaust passages 12 and 13 respectively.

The piston valve 3, comprises a hollow body, 14, and bull-rings, 15, intermediate rings, 16, and followers, 17, at each end of the piston valve said followers being mounted upon and secured to a shaft, 18, and the bull-rings, 15, and intermediate rings, 16, being interposed between the hollow body member, 14, and the said bull-rings. Piston rings, 19, 19, are provided at each end of the piston valve. Located in the bull-rings at various points around the circumference thereof is a series of L-shaped passages, 20, extending from the periphery of said rings to the side surface abutting the intermediate rings, 16. The intermediate rings, 16, have apertures, 21, therein corresponding in number and position with the apertures, 20, in the bull-rings, the said intermediate rings having also a series of apertures, 22, therein leading from the outer surface of said rings to the interior surface thereof, said apertures, 22, giving access to the interior of the hollow cylinder, 14. Extending around each of the intermediate rings, 16, is a ring valve, 23, of substantially L-shaped cross section, one leg of the said ring covering the apertures, 21, while the other leg covers the aperture 22. The L-shaped ring valve is adapted to slide upon the outer surface of the intermediate rings, 16, and packing rings, 24, are located upon the intermediate rings and act against the inner surface of the valve ring, 23. Located at each end of the hollow body member, 14, is a series of outwardly extending lugs, 25, said lugs being spaced around the circumference of said body member and each being apertured at 26 to receive a piston pin, 27. The piston pins, 27, have a shoulder, 28, formed thereon, and a spring, 29, is interposed between said shoulder and the shoulder 25ᵃ formed upon the said lugs, 25, whereby said piston pins, 27, are forced outwardly against the sides of the said ring valves, 23, the springs tending to hold said piston valves to their seats, closing the apertures 21 and 22.

Figure 3:
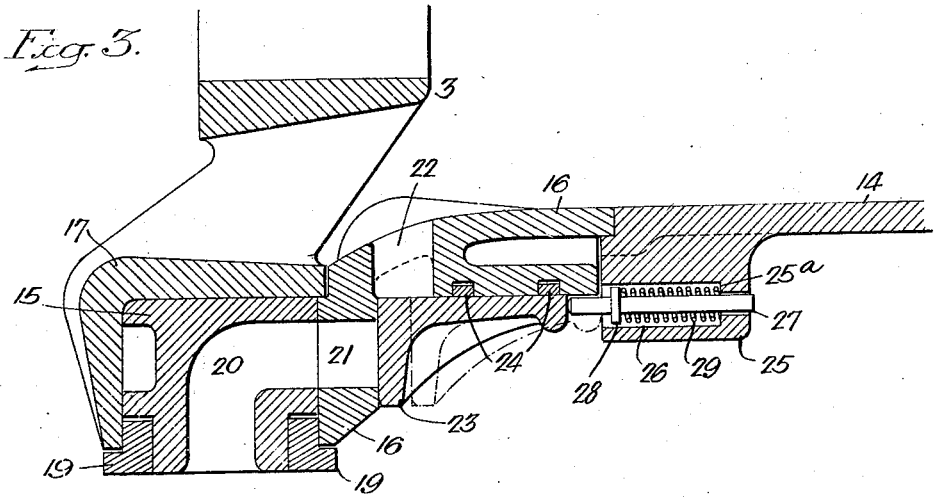
Fig. 3 is a detached sectional view of a portion of the piston valve illustrating the details of the valve structure of the type used with super-heated steam.

The operation of the device is as follows:

The ring valves, 23, are normally held to their seats, closing the apertures 21 and 22, by the pressure of the live steam entering the valve chamber, 2, through the passage, 5, leading from the steam pipe, and also by the pressure of the springs, 29, exerted through the pins, 27. Should the back pressure in the cylinder of the engine become excessive due to the compression of steam, or water in the cylinder by the movement of the piston therein, or for any other reason, the piston rings 23 will be forced back by the said excessive back pressure acting through the passages, 20, in the bull-rings and the apertures, 21, in the intermediate rings, said backward position of the piston ring being indicated in broken lines in Fig. 3. In this position the passages 21 and 22 are uncovered by the valve ring thereby opening up passages between the cylinder of the engine, the steam chest, and the exhaust. Under these conditions the excessive pressure in the cylinders is immediately relieved and a general balance of pressure in the entire engine obtained. Following the reduction of the pressure in the cylinder, the valve ring, 23, under the pressure of the steam and springs, 29, will return immediately to the forward position covering the passages 21 and 22.

In Fig. 4 I have illustrated my relief mechanism adapted to use in engines employing saturated steam, in which no drifting valve is provided. The details of construction are similar in all respects to those already described with the exception that the force of the spring, 29$^a$, is brought to bear upon the outer surface of the valve rings, 23, through the pins 27$^a$. In this case the pins 27$^a$ and the springs 29$^a$ are mounted in apertures, 30, extending through the bull-rings and through the intermediate rings, 16, the tendency of the springs being to force the ring valves away from their seats covering the passages 21 and 22, and thereby form a by-pass to either end of cylinder when steam is cut off and engine drifting. The pressure of the springs 29$^a$ upon the rings, 23, is such as to prevent any vibration of the ring valve after the excessive back pressure has forced said valve from its seat, the valve being held to its seat by the pressure of the live steam coming from the steam chest of the engine.

It is obvious that the construction described may be modified in numerous respects with no departure from the essential features of the invention.

In the modifications illustrated in Figs. 5 and 6, I have shown a piston valve equipped with my by-pass valve and particularly adapted to low speed engines. The piston valve shown in Fig. 5, consists of a hollow cylindrical body, 31, formed of steel tubing or the like, which extends through the length of the valve and near each end of which is attached by means, in the present case, of rivets, 32, an L-shaped backing flange, 33. Between the flange, 33, and the follower, 34, one of which is attached at each end of the body, 31, in the usual manner, is carried a bull-ring, 35, provided with an annular recess, 36, in which is located a ring valve, 37. Packing rings 38 and 39 are provided in the bull-ring and on the said ring valve, 37, respectively, while the piston rings 40 and 41 are located in the usual manner between the bull-ring and the follower and flange 33 respectively at each end of the piston valve. Passages 42 and 43, a series of which extend around the whole circumference of the bull-ring, extend from the said annular recess, 36, to the outer and inner surfaces of the said bull-ring respectively. A series of holes, 44, corresponding with the holes 43 in the bull-ring, is formed in the tubular body, 31, while a further series of apertures, 45, is formed in the backing flange, 33, and gives access from the space around the outside of the tubular body, 31, to the annular recess, 36. This valve is of the inside admission type, the ring valve being held to its seat by the pressure of the live steam from the steam chest operating through the apertures, 45. When seated, the ring valve closes the passages 42 and 43, as shown, but when forced back by excessive pressure in the engine cylinder the passages 42 and 43 are united and the excess pressure is accordingly relieved into the exhaust chamber. No springs are necessary in engines employing piston valves of this type.

In the piston valve of Fig. 6, which is of the outside admission type, the construction is in general similar to the valve of Fig. 5, with the exceptions that the positions of the bull-ring and ring valve are substantially reversed, the pressure of the live steam in holding the ring valve 37$^a$ to its seat being exerted through a series of holes, 46, formed in the follower, 34$^a$. In this case the passages 42$^a$, 43$^a$, corresponding to the passages 42 and 43 of Fig. 5, connect with the apertures 45$^a$ in the flange 33$^a$. In this manner, when the ring valve is forced from its seat the excessive pressure is relieved into the exhaust, which is desirable, particularly in high speed engines.

In an engine utilizing my by-pass device there can be no breaking of the cylinders, nor knocking out of cylinder heads due to excessive back pressure in the cylinders, nor are any of the other accidents, which at present are known to arise from excessive compression, or improperly set valves such as the breaking of the frames between the cylinders and main pedestal, the bending of the main rods, or the development of knocks in the main boxes with a consequent tendency to heat main journals, possible. Furthermore a valve equipped with my by-pass will not suck gases and cinders from the smoke-box through the exhaust pipe into the cylinder when the engine is drifting with a consequent cutting off the valve seat and cylinders, this being due to the fact that the said ring valves will open when drifting, thereby establishing an unobstructed passage between both ends of the cylinder and the exhaust chamber and steam chest, with a resulting equalization of pressure throughout.

I claim:

1. A piston valve comprising a pair of substantially ring-shaped pistons having extending therebetween a tubular body, whereby a longitudinal passage is formed through said valve from end to end thereof, said pistons having passages extending from the peripheries thereof to the inner opposed faces, ports forming communication between the said longitudinal passage and the space outside of the said body and between the pistons, and relief valves adapted to close the said ports and passages at each end of said piston valve.

2. In a steam engine, the combination with a valve chamber, of ducts extending from said valve chamber to a source of steam supply, to the exhaust and to each end of the cylinder of said engine, a piston valve in said valve chamber comprising a pair of substantially ring-shaped pistons having extending therebetween a tubular body, whereby a longitudinal passage is formed through the piston valve establishing communication between the ends of said valve chamber, said pistons having passages therein whereby communication may be established between the said cylinder ducts and the space outside of said body and between the said pistons, ports at each end of said piston valve establishing communication between the said space outside of said body and between the said pistons and the ends of said valve chamber, and a relief valve adapted to close said ports and passages at each end of said piston valve.

JOHN A. PFEIFFER.